March 14, 1961
H. V. PARSLEY ET AL
2,974,997
HEATED TRUCK BODY
Filed May 11, 1959
3 Sheets-Sheet 3
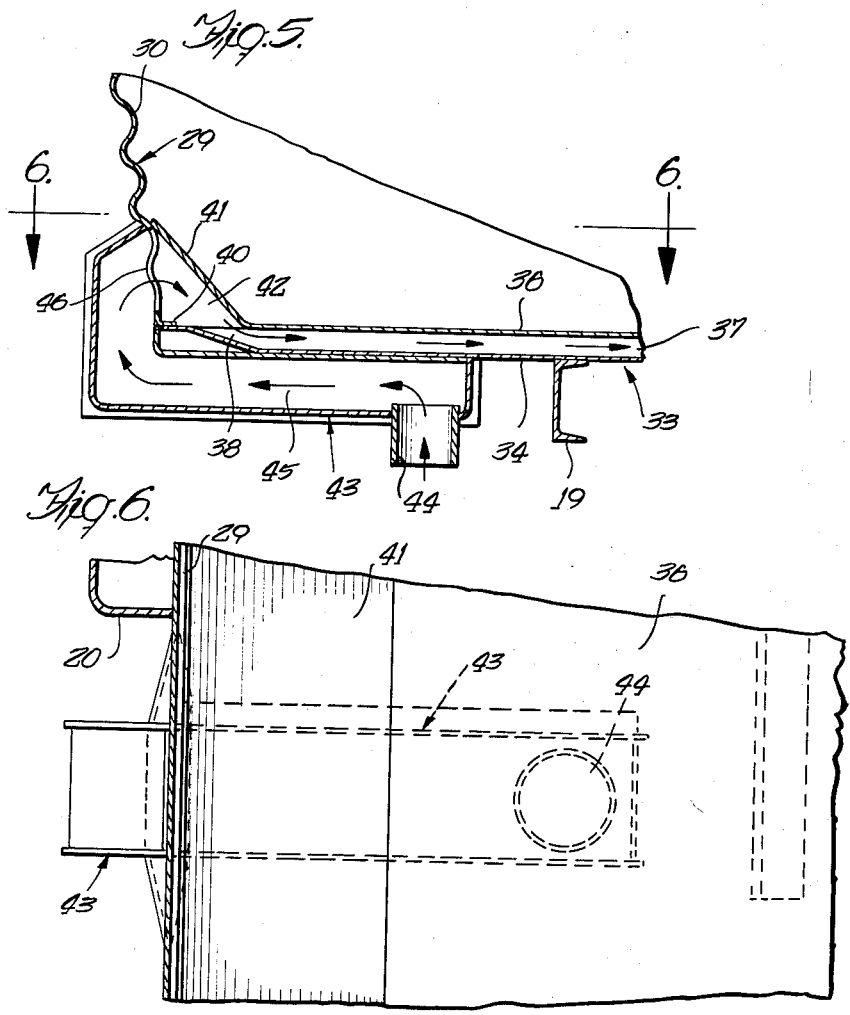
INVENTORS
HAROLD V. PARSLEY
RICHARD E. DREYER
GEORGE A. GRANT
Paul O. Pippel
ATTORNEY

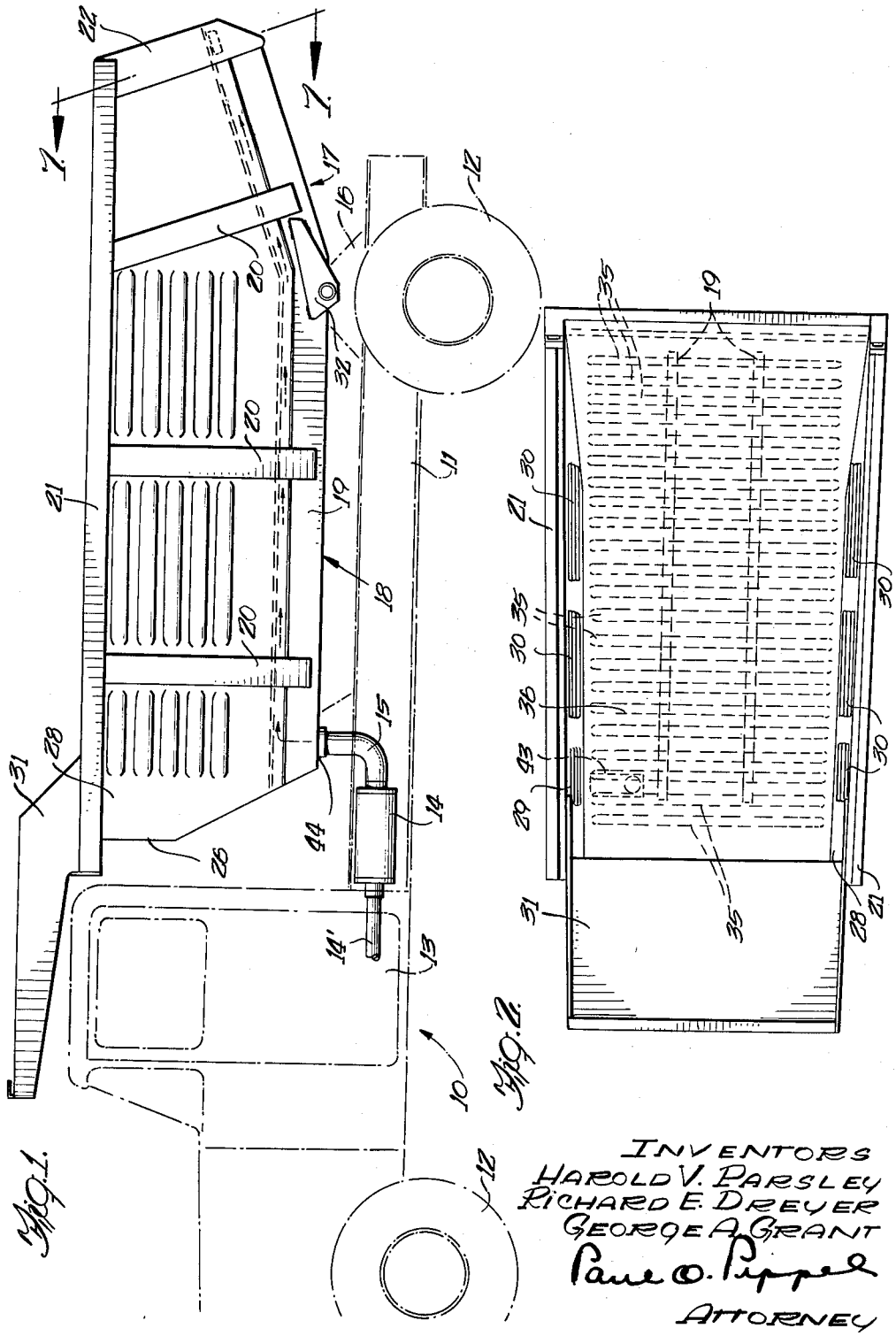

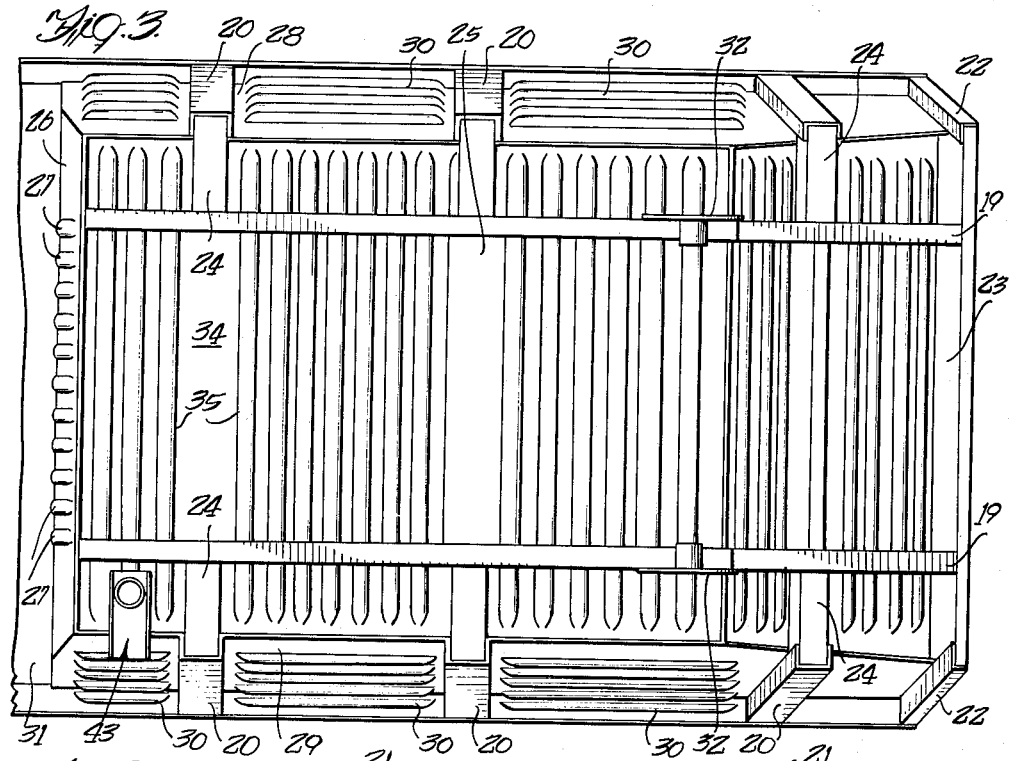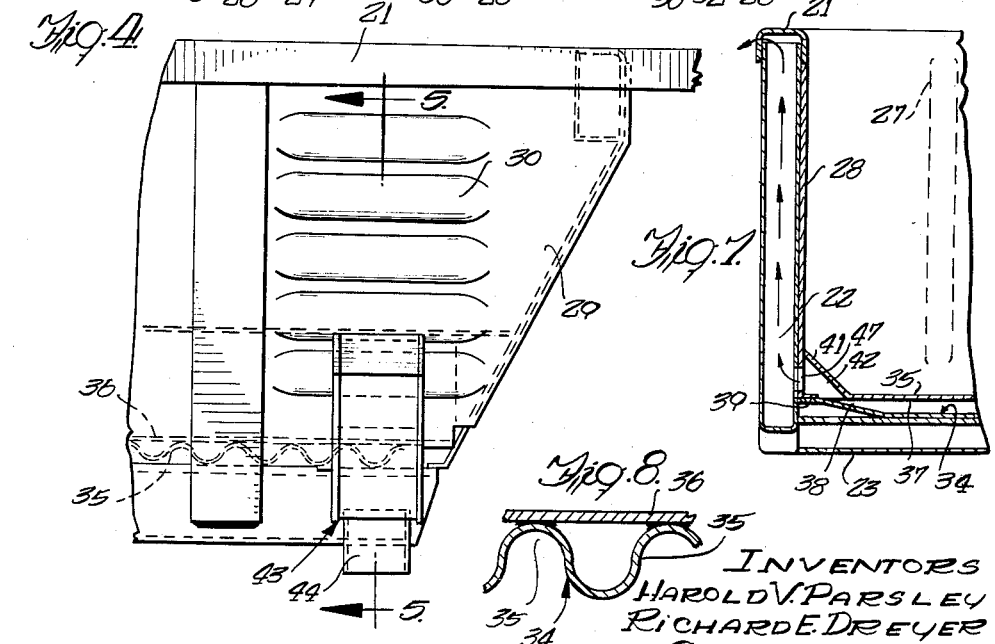

United States Patent Office 2,974,997
Patented Mar. 14, 1961

2,974,997

HEATED TRUCK BODY

Harold V. Parsley, Barrington, Richard E. Dreyer, Wheaton, and George A. Grant, Elmhurst, Ill., assignors to International Harvester Company, Chicago, Ill., a corporation of New Jersey Filed May 11, 1959, Ser. No. 812,518

9 Claims. (Cl. 296—28)

This invention relates to automotive vehicles and more particularly to a truck body. More specifically the invention relates to an improved heated truck body.

In earth moving trucks of the dump body type it is frequently desirable to heat the body of the truck in order to facilitate the dumping and removal of earth from the body. Trucks of this type are generally utilized during cold weather and frequently earth freezes within the body making it difficult to dump the material therefrom. Also in wet weather clay and soil may become packed within the body which makes it difficult to dump the same. In order to overcome these difficulties it has been found desirable, as evidenced by the prior art, to heat truck bodies so that the heat will keep the earth or material from freezing, and which in wet conditions, will provide suitable drying means so that the load will not stick to the bottom of the truck body and may be easily dumped. It is a prime object of this invention to provide an improved truck body having a novel construction facilitating the heating of the body.

A still further object is the provision of an improved body construction for trucks, the said body construction consisting of corrugated side members which enhance the structural strength of the body while simultaneously permitting the body to be constructed of relatively light materials.

A still further object of the invention is to provide an improved construction wherein the bottom of a truck body may be easily heated.

A still further object is the provision of an improved dump body construction having a bottom consisting of a plurality of individual passages which are interconnected to receive heated fluid for suitably heating the body.

A still further object is the provision of an improved heated body construction comprising a pair of vertically spaced bottom members, one of said bottom members including corrugations providing individual passages which connect laterally spaced passageways in turn suitably connected to a source of heat for heating the body to facilitate the dumping of a load from said body.

These and further objects will become more readily apparent from a reading of the specification when examined in connection with the accompanying sheets of drawings.

In the drawings:

Figure 1 is a side elevational view showing an improved truck body supported on a truck chassis;

Figure 2 is a plan view of the truck body shown in Figure 1;

Figure 3 is a bottom view of the truck body shown in Figure 1;

Figure 4 is an enlarged detail view of a righthand front side portion of a truck body shown in Figure 1;

Figure 5 is a cross sectional view taken substantially along the line 5—5 of Figure 4;

Figure 6 is a cross sectional view taken substantially along the line 6—6 of Figure 5;

Figure 7 is a cross sectional view taken along the line 7—7 of Figure 1; and

Figure 8 is a fragmentary sectional view through a bottom structure of a truck body.

Referring now particularly to Figure 1 a truck is generally designated by the reference character 10 and includes a chassis 11 supported on ground wheels 12. The truck includes a truck cab 13 and the chassis 11 suitably supports a muffler 14 having a conduit 14' suitably connected to an engine (not shown). The muffler 14 includes an exhaust pipe 15. A pair of pivot brackets 16 are suitably supported on the chassis 11.

A truck body is generally designated by the reference character 17. The body 17 is of the dump type including a frame generally designated at 18. The frame 18 comprises a pair of longitudinally extending and transversely spaced frame members 19. As best shown in Figure 3 the body 17 also includes a plurality of channel shaped uprights 20 which are suitably connected at their upper ends to a pair of longitudinally extending transversely spaced channel beams 21. The truck body 17 may be connected together by means of welding and the specific welding connection of each of the parts will not be referred to. The rear end of the body 17 is provided with a pair of transversely spaced substantially upwardly extending rear members 22 of box-like construction as particularly shown in Figures 3 and 7.

The uprights 20, as shown in Figure 3, are connected to the frame members 19 by means of a plurality of short transversely extending frame members 24. At the rearmost portions the frame members 19 are connected by a box-type transverse rear member 23 which also is in turn connected to the lower ends of the box-type members 22. A cross member 25 also suitably connects the frame members 19 substantially intermediate the front and rear ends of the body 17.

The truck body 17 further includes a front wall 26 best shown in Figures 3 and 7. The front wall 26 includes a plurality of vertically extending transversely spaced corrugations 27 which serve to stiffen the front wall. The body 17 further includes a left-hand side wall 28 and a right-hand side wall 29. As best shown in Figure 3 each of the side walls 28 and 29 includes a plurality of longitudinally or horizontally extending corrugations which are vertically spaced and which serve to suitably stiffen the side walls so that a relatively light sheet metal structure can be utilized. The truck body 17 also includes a cab guard 31 best shown in Figures 1 and 2. The frame members 19 also have suitably connected thereto a pair of pivot brackets 32 which cooperate with the pivot bracket 16 so that the body 17 may be pivoted to a dumped position.

The truck body 17 includes a bottom structure generally designated at 33. The bottom structure 33 comprises a lower plate member 34 extending the length and width of the said body 17. The lower plate member 34 comprises a plurality of transversely extending longitudinally spaced corrugations 35. An upper bottom member 36, substantially coextensive with the member 34, is supported upon the said member 34 and is suitably connected thereto to provide with the corrugations a plurality of individual transversely extending passages 37. The lower plate member 34, as shown in Figure 7, has one edge portion connected to a flange 39 formed at the lower portion of the wall 28. As shown in Figure 5, the plate member 34 also has its other edge portion suitably connected to a flange 40 formed at the lower end of the wall 29.

As shown in Figures 5 and 7, the opposite ends of the corrugation 35 are less shallow in depth and these portions of the plate member 34, in which the corrugations 35 are formed, slope upwardly and form upwardly sloping troughs or passages 38 providing for communication between the passages 37 and the passageways 42. The upper bottom member 36 is also provided at laterally spaced ends with upwardly sloping or diverging side portions 41 which engage the side walls 28 and 29 and are suitably connected thereto by welding or other fastening means. The portions 41 provide with the side walls 28 and 29 and plate member 34 a pair of transversely spaced and logitudinally extending passageways 42. As best shown in Figures 5 and 7 the passages 37 are in direct communication with the passageways 42.

An inlet casing 43, as best shown in Figures 4 and 5, is positioned on the right-hand side of the body 17 adjacent the front wall 26. The inlet casing 43 includes an inlet connection 44, which as shown in Figure 1, is adapted to be placed into connected relation with the exhaust pipe 15. The inlet casing 43 also includes a chamber 45 which by means of an opening 46 in the side wall 29 communicates with one of the passageways 42. As best shown in Figure 7 the rear end of one of the left hand passageways 42 communicates with the interior of the box-type member 22 by means of opening 47 suitably formed by apertures through the said box member 22 and side wall 28.

In the operation exhaust from the engine passes through the muffler 14 through the exhaust pipe 15, into the chamber 45 whereupon the hot exhaust gas enters into the right-hand passageway 42. The hot exhaust gas flows through the passageway toward the rear end of the body and transversely through the troughs 38, the passages 37, through the other passageway 42 on the left-hand side of the body 17. The gas is then discharged from the rear end of the body 17 through an opening 47 upwardly through the box member 22 and to the atmosphere.

The bottom members 34 and 36 may be made of a relatively light material having good heat transfer properties. By virtue of the corrugations the bottom is sufficiently stiffened structurally and the individual passages supplied by each of the corrugations assures sufficient heat transfer through the body so that the load carried on the bottom may be sufficiently kept warm to permit efficient dumping. Thus the bottom is of light structure, structurally strong and has a high degree of heat transfer efficiency so that the body is adequately heated and ease of dumping is assured. Furthermore, the corrugations of the side walls and the front wall of the body also permit the use of light material while assuring a sound and strong structure.

Thus it can be seen that the objects of the invention have been fully achieved and an improved truck body has been disclosed. It must be understood that changes and modifications may be made without departing from the spirit of the invention or the scope thereof as defined in the appended claims.

What is claimed is:

1. A truck body comprising a frame, upright laterally spaced side walls supported on said frame, said side walls each including a corrugated portion having a plurality of horizontally extending and vertically spaced corrugations, a front wall connecting said side walls, said front wall including a plurality of vertically extending and horizontally spaced corrugations, a bottom for said body comprising a corrugated bottom member having a plurality of transversely extending longitudinally spaced corrugations, said corrugations of said corrugated bottom member extending substantially the width of said body and being disposed substantially the length of said body, a second bottom member disposed on said corrugated bottom member, and with said corrugations of said corrugated bottom member providing a plurality of transversely extending passages, said second bottom member having outer lateral edge portions extending longitudinally substantially the length of said body, said edge portion extending angularly upwardly into contact with said side walls to provide a pair of horizontally spaced longitudinally extending passageways adjacent lower portions of said side walls, each of said corrugations in said corrugated bottom having outer portions spaced from said second bottom member to provide with said bottom member openings at opposite ends of said passages communicating with said passageways, an inlet casing connected to said corrugated body adjacent the front wall, said casing having a chamber, an inlet opening on said casing, one of said side walls including an opening providing communication between said chamber and one of said passageways, whereby a heated fluid may flow through said last mentioned opening to one of said passageways, through said passage to said other passageway whereby said bottom members are heated, and means disposed near a rear portion of said body for discharging fluid from said passages and passageways.

2. A truck body comprising a frame, upright laterally spaced side walls supported on said frame, said side walls each including a corrugated portion having a plurality of horizontally extending and vertically spaced corrugations, a front wall connecting said side walls, said front wall including a plurality of vertically extending and horizontally spaced corrugations, a bottom for said body comprising a corrugated bottom member having a plurality of transversely extending longitudinally spaced corrugations, said corrugations of said corrugated bottom member extending substantially the width of said body, and being disposed substantially the length of said body, a second bottom member disposed on said corrugated bottom member, and with said corrugations of said corrugated bottom member providing a plurality of transversely extending passages, said second bottom member having outer lateral edge portions extending longitudinally substantially the length of said body, said edge portions extending angularly upwardly into contact with said side walls to provide a pair of horizontally spaced longitudinally extending passageways adjacent lower portions of said side walls, each of said corrugations in said corrugated bottom having outer portions spaced from said second bottom member to provide with said bottom member openings at opposite ends of said passage communicating with said passageways, an inlet casing connected to said corrugated bottom adjacent the front wall, said casing having a chamber, in inlet opening on said casing, one of said side walls including an opening providing communication between said chamber and one of said passageways, whereby a heated fluid may flow through said last mentioned opening to one of said passageways, through said passages to said other passageway whereby said bottom members are heated, and means on said body discharging fluid from said passages and passageways.

3. A truck body comprising a frame, upright laterally spaced side walls supported on said frame, said side walls each including a corrugated portion having a plurality of horizontally extending and vertically spaced corrugations, a front wall connecting said side walls, said front wall including a plurality of vertically extending and horizontally spaced corrugations, a bottom for said body comprising a corrugated bottom member having a plurality of spaced corrugations, said corrugations of said corrugated bottom member extending substantially the width of said body and being disposed substantially the length of said body, a second bottom member disposed on said corrugated bottom member, and with said corrugations of said corrugated bottom member providing a plurality of transversely extending passages, said second bottom member having outer lateral edge portions extending longitudinally substantially the length of said body, said edge portions extending upwardly into contact with said side walls to provide a pair of horizontally spaced longitudinally extending passageways adjacent lower portions of said side walls, each of said corrugations in said corrugated bottom having outer portions spaced from said second bottom member to provide with said bottom member openings at opposite ends of said passages communicating with said passageways, an inlet casing connected to said body, said casing having a chamber, an inlet opening on said casing providing communication between said chamber and one of said passageways, whereby a heated fluid may flow through said last mentioned opening to one of said passageways, through said passages to said other passageway whereby said bottom members are heated, and means discharging fluid from said passages and passageways.

4. A truck body comprising a frame, upright laterally spaced side walls supported on said frame, said side walls each including a corrugated portion having a plurality of horizontally extending and veritcally spaced corrugations, a bottom for said body comprising a corrugated bottom member having a plurality of transversely extending longitudinally spaced corrugations, said corrugations of said corrugated bottom member extending substantially the width of said body and being disposed substantially the length of said body, a second bottom member disposed on said corrugated bottom member, and with said corrugations of said corrugated bottom member providing a plurality of transversely extending passages, said second bottom member having outer lateral edge portions extending longitudinally substantially the length of said body, said edge portions extending upwardly into contact with said side walls to provide a pair of horizontally spaced longitudinally extending passageways adjacent lower portions of said side walls, each of said corrugations in said corrugated bottom having outer portions spaced from second bottom member to provide with said bottom member openings at opposite ends of said passage communicating with said passageways, an inlet casing connected to said body, said casing having a chamber, an inlet opening on said casing providing communication between said chamber and one of said passageways, whereby a heated fluid may flow through said last mentioned opening to one of said passageways, through said passages to said other passageway whereby said bottom members are heated, and means discharging fluid from said passages and passageways.

5. A truck body comprising a frame, upright laterally spaced side walls supported on said frame, a bottom for said body comprising a corrugated bottom member having a plurality of transversely extending longitudinally spaced corrugations, said corrugations extending substantially the width of said body, a second bottom member disposed on said corrugated bottom member, and with said corrugations providing a plurality of transversely extending passages, said second bottom member having outer lateral edge portions extending longitudinally substantially the length of said body, said edge portion extending upwardly into contact with said side walls to provide a pair of horizontally spaced longitudinally extending passageways adjacent lower portions of said side walls, each of said corrugations in said corrugated bottom having outer portions spaced from said second bottom member to provide with said bottom member openings at opposite ends of said passages communicating with said passageways, an inlet casing connected to said body, said casing having a chamber, an inlet opening on said casing providing communication between said chamber and one of said passageways, whereby a heated fluid may flow through said last mentioned opening to one of said passageways, through said passages to said other passageway whereby said bottom members are heated, and means on said body discharging fluid from said passages and passageways.

6. A truck body comprising a frame, upright laterally spaced side walls supported on said frame, a bottom for said body comprising a corrugated bottom member having a plurality of spaced corrugations, a second bottom member disposed on said corrugated bottom member, and with said corrugations providing a plurality of transversely extending passages, said second bottom member having outer lateral edge portions extending longitudinally substantially the length of said body, said edge portions extending into contact with said side walls to provide a pair of horizontally spaced longitudinally extending passageways adjacent lower portions of said side walls, each of said corrugations in said corrugated bottom having outer portions spaced from said second bottom member to provide with said bottom member openings at opposite ends of said passageways communicating with said passageways, an inlet casing connected to said body, said casing having a chamber, and an inlet opening on said casing providing communication between said chamber and one of said passageways, whereby a heated fluid may flow through said last mentioned opening to one of said passageways, through said passage to said outer passageway whereby said bottom members are heated.

7. A vehicle body comprised of side and bottom walls, a manifold associated with a side wall adjacent said bottom wall, said bottom wall being formed of two plies of metal sheet stock connected together, the upper of said plies along its side margins being offset from the other ply, the edges of the offset portions being sealed to adjacent side walls so that the offset portions and the included portion of the side walls form said manifolds, the other one of said plies having corrugations therein, said corrugations in cooperation with the upper ply defining fluid conduits extending across said bottom wall, said conduits terminating in said manifolds in open communication therewith, and means for admitting fluid to said manifold for distribution to and circulation through said conduits.

8. A vehicle body comprised of side and bottom walls, said bottom wall being formed of two plies of metal sheet stock connected together; one of said plies along one of its margins being offset with respect to the other ply in spaced relation thereto, the edge of said offset portion being sealed to an adjacent side wall to define a manifold; the other of said plies having corrugations therein, said corrugations in cooperation with said first mentioned ply defining fluid conduits extending across said bottom wall normal to said manifold, said conduits terminating in said other ply in open communication with said manifold, and means for admitting fluid to said manifold for distribution to and circulation through said conduits.

9. A vehicle body bottom comprised of two plies of sheet metal secured together, the upper ply being flat and along its opposed side margins being offset at an angle with respect to the other ply defining triangular manifolds therebetween, the lower ply having coplanar side and end margins, corrugations pressed downwardly from the plane of said lower ply extending normal to and terminating in open communication with said manifolds, said corrugations in cooperation with said upper ply forming conduits extending between said manifolds, means for admitting fluid to the front end of one of said manifolds, and means for exhausting fluid from the rear end of the other of said manifolds.

References Cited in the file of this patent

UNITED STATES PATENTS

| | | |
|---|---|---|
| 697,949 | Schofield | Apr. 15, 1902 |
| 1,942,207 | Ferwerda | Jan. 2, 1934 |
| 2,166,753 | Derleth | July 18, 1939 |
| 2,273,244 | Ambruster | Feb. 17, 1942 |
| 2,275,705 | Wagner | Mar. 10, 1942 |
| 2,595,028 | Vutz | Apr. 29, 1952 |
| 2,630,236 | Arkoosh | Mar. 3, 1953 |
| 2,692,796 | Rittenhouse | Oct. 26, 1954 |
| 2,925,301 | Milligan | Feb. 16, 1960 |

FOREIGN PATENTS

| | | |
|---|---|---|
| 746,737 | Great Britain | Mar. 21, 1956 |